United States Patent Office 3,415,831
Patented Dec. 10, 1968

3,415,831
2-ISOQUINOLINYL(AND CARBOLINYL) ALKYL-OCTAHYDROINDOLO [2,3-A]-QUINOLIZINES
Jerry A. Weisbach, Cherry Hill, N.J., assignor to Smith, Kline & French Laboratories, Philadelphia, Pa., a corporation of Pennsylvania
No Drawing. Continuation-in-part of application Ser. No. 461,542, June 4, 1965. This application July 16, 1965, Ser. No. 472,669
8 Claims. (Cl. 260—288)

ABSTRACT OF THE DISCLOSURE 2-isoquinolinyl (and carbolinyl)alkyloctahydroindolo-[2,3-a]quinolizines, having analgesic and hypotensive activity, are prepared by reacting an octahydroindolo[2,3-a]quinolizine-2-lower alkanoic acid ester with a phenethylamine or an aminoethylindole and treating the resulting N-substituted-octahydroindolo[2,3-a]quinolizine-2-lower alkanoic acid amide with a dehydrating agent. The $2\alpha,3\alpha,12b\text{-}\alpha$ isomers of the octahydro[2,3-a]quinolizine-2-lower alkanoic acid ester intermediates are prepared by converting a 2-lower alkoxycarbonylmethylene-octahydro[2,3-a]quinolizine to the corresponding 2-alkoxycarbonylmethyl-1,4-dihydro compound, oxidizing to give the indolo[2,3-a]quinolizinium salt and hydrogenating or, alternatively, oxidizing a 2-lower alkoxycarbonylmethyleneoctahydro[2,3-a]quinolizine and hydrogenating the resulting indolo[2,3-a]quinolizinium salt.

This application is a continuation-in-part of Ser. No. 461,542 filed June 4, 1965, now abandoned.

This invention relates to new 2-isoquinolinyl(and carbolinyl)alkyl-octahydroindolo[2,3-a]quinolizines having pharmacological activity, in particular having activity such as analgesic and hypotensive activity. Also this invention relates to novel intermediates and to processes for preparing $2\alpha,3\alpha,12b\text{-}\alpha$ isomers of octahydroindolo [2,3-a]quinolizines.

The pharmacologically active compounds of this invention are represented by the following formulas:

Formula I

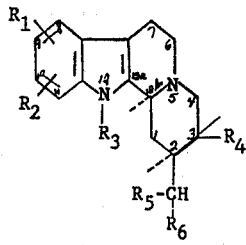

Formula II

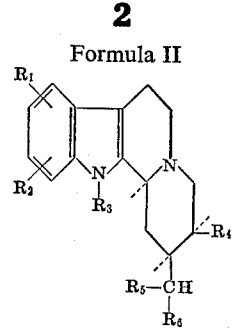

in which:

$R_1$ and $R_2$ represent hydrogen, halogen, hydroxy, lower alkoxy, lower alkyl or, and when on adjacent carbon atoms, methylenedioxy;
$R_3$, $R_4$ and $R_5$ represent hydrogen or lower alkyl;
$R_6$ represents

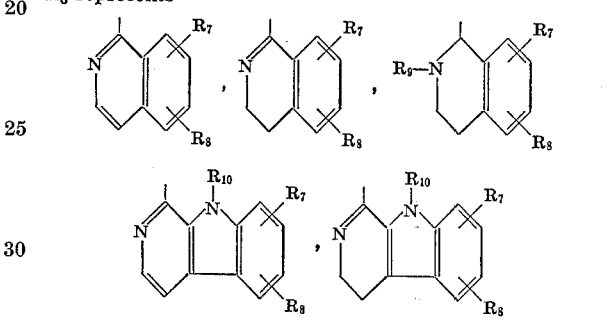

and

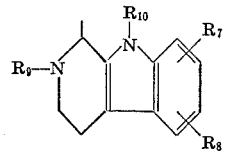

$R_7$ and $R_8$ represent hydrogen, halogen, hydroxy, lower alkoxy, lower alkyl or, and when on adjacent carbon atoms, methylenedioxy; and
$R_9$ and $R_{10}$ represent hydrogen, lower alkyl or phenyl-lower alkylene.

This invention also includes pharmaceutically acceptable salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylene-salicylic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

In addition, this invention includes pharmaceutically acceptable, nontoxic quaternary ammonium salts of the above defined bases formed with, for example, a reactive lower alkyl halide or sulfate, p-toluene sulfonate, benzene sulfonate or lower alkyl sulfonate.

This invention also includes the novel benzyloxy intermediates for the compounds of Formulas I and II, that is compounds wherein any of $R_1$, $R_2$, $R_7$ and $R_8$ are benzyloxy.

The novel compounds of this invention represented by Formulas I and II and nontoxic, pharmaceutically acceptable, acid addition salts and quaternary ammonium salts thereof may be administered orally or parenterally in conventional dosage forms, such as tablets, capsules, injectables or the like by incorporating the appropriate dose of the compound with carriers according to accepted pharmaceutical practices.

Compounds of this invention are prepared by reacting the 2α,3α,12b-β isomer or the 2α,3β,12b-β isomer of an octahydroindolo[2,3-a]quinolizine-2-acetic acid ester with a β-$R_{11}$-ethylamine to give the corresponding isomers of N-($R_{11}$-CH$_2$CH$_2$) - octahydroindolo[2,3-a]quinolizine-2-acetamide. This intermediate is treated with a dehydrating agent such as phosphorus oxychloride, phosphorus pentoxide, phosphorus pentachloride or polyphosphoric acid to give the 2α,3β,12b-α isomers and the 2α,3α,12b-α isomers of the 2-isoquinolinyl(or carbolinyl)alkyl-octahydroindolo[2,3-a]quinolizines of this invention.

The above described procedure is illustrated for the 2α,3β,12b-α isomers as follows:

Procedure

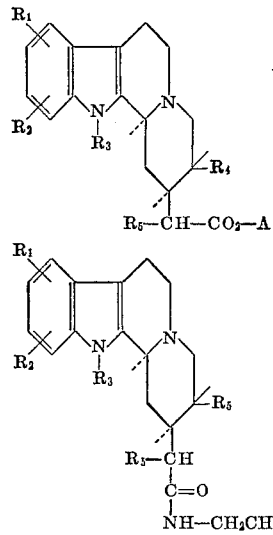

in which:
$R_1$ and $R_2$ are hydrogen, halogen, benzyloxy, lower alkoxy, lower alkyl or, and when on adjacent carbon atoms, methylene-dioxy;
$R_{3-5}$ are as defined above;
$R_6$ is

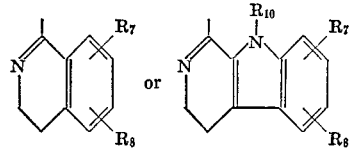

$R_{11}$ is

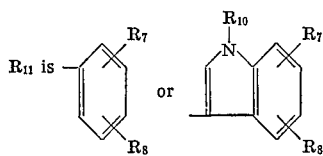

A is lower alkyl;
$R_7$ and $R_8$ are hydrogen, halogen, benzyloxy, lower alkoxy, lower alkyl or, and when on adjacent carbon atoms, methylene-dioxy; and
$R_{10}$ is as defined above.

The octahydroindolo[2,3 - a]quinolizine - 2 - acetic acid ester starting materials in the above described procedure for preparing compounds of this invention are prepared as follows:

Procedure 2

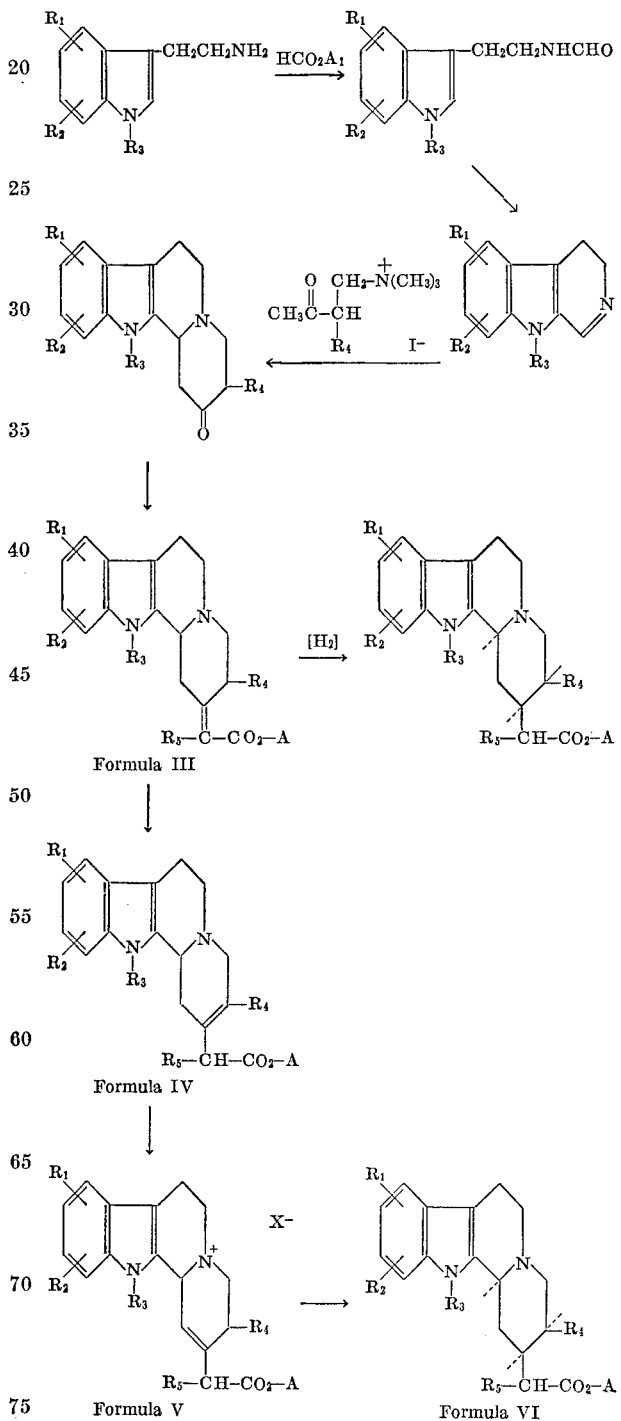

The terms $R_1$-$R_5$ and A in Procedure 2 are as defined for Procedure 1, $A_1$ is lower alkyl and X is anion.

According to the above procedure a 3-(2-amino-ethyl) indole is reacted with a lower alkyl formate to give the N-formyl compound which is treated with a dehydrating agent such as phosphorus oxychloride, phosphorus pentoxide, phosphorus pentachloride of polyphosphoric acid to give the 3,4-dihydro-$\beta$-carboline. Reacting this carboline with a $\beta$-acetylethylamine methiodide gives the 2-oxo-octahydro[2,3-a]quinolizine which is converted to the corresponding 2-lower alkoxy-carbonylmethylene compound by treating with a tri-lower alkyl phosphonoacetate which optionally has an $\alpha$-lower alkyl substituent.

Reduction of the above prepared intermediate by hydrogenation using a catalyst such as palladium on carbon gives the $\alpha,\beta,\alpha$-isomer of the octahydroindolo[2,3-a]-quinolizine-2-acetic acid ester starting materials for the compounds of this invention.

The process represented by the steps from Formula III→IV→V→VI in Procedure 2 above is another object of this invention. This process provides a new method for the preparation of the $2\alpha,3\alpha,12b$-$\alpha$ isomers of octahydro[2,3-a]quinolizines. According to this procedure a 2-lower alkoxycarbonylmethyleneoctahydro[2,3-a]quinolizine is reacted with an alkali metal alkoxide in anhydrous lower alkanol, such as sodium ethoxide in ethanol, to give the corresponding 2-alkoxycarbonylmethyl-1,4-dihydro compound. This intermediate is oxidized by treating with a mild oxidizing agent, such as iodine with anhydrous sodium acetate in alcohol or mercuric acetate, to give the indolo[2,3-a]quinolizinium salt. Hydrogenation of this intermediate using a catalyst such as palladium on carbon with an excess of base such as sodium ethoxide or trimethylamine in a lower alkanol such as ethanol gives the $2\alpha,3\alpha,12b$-$\alpha$ isomer of the octahydroindolo[2,3-a]quinolizine-2-acetic acid ester starting materials for the compounds of this invention.

Another object of this invention is an alternative process for the preparation of the $2\alpha,3\alpha,12b$-$\alpha$ isomers of the octahydroindolo[2,3-a]quinolizine-2-acetic acid ester starting material by a process represented by the steps from Formula III→V→VI in Procedure 2 above. According to this procedure a 2-lower alkoxycarbonylmethyleneoctahydro[2,3-a]quinolizine is oxidized with mercuric acetate or with palladium on charcoal and maleic acid in aqueous medium to give the indolo[2,3-a]quinolizinium salt. Hydrogenation of this intermediate as described above gives the $2\alpha,3\alpha,12b$-$\alpha$ isomer of the octahydroindolo[2,3-a]quinolizine-2-acetic acid ester starting materials for the compounds of this invention.

The compounds of Formulas I and II in which $R_6$ is

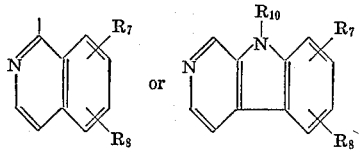

are prepared by treating the corresponding dyhydro compounds prepared as described by Procedure 1 with a mild oxidizing agent such as iodine in alcohol with anhydrous sodium acetate. Treating the dihydro compounds with a reducing agent such as sodium borohydride or hydrogenating using a catalyst gives the compounds of Formulas I and II in which $R_6$ is

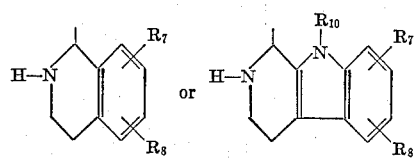

The compounds of Formulas I and II in which any of $R_1$, $R_2$, $R_7$ and $R_8$ are hydroxy groups are prepared by cleaving the corresponding benzyloxy or methoxy compounds which are prepared as described by Procedure 1. The compounds in which $R_9$ is lower alkyl are prepared by alkylation of the corresponding N-unsubstituted compound, for example with formaldehydeformic acid or with a lower acyl halide and lithium aluminum hydride reduction.

The following examples are not limiting but are illustrative of compounds of this invention.

EXAMPLE 1

A mixture 2.3 g. of methyl 3-ethyl-1,2,3,4,6,7,12,12b-octahydroindolo[2,3-a]quinolizine-2-acetate and 3.0 g. of $\beta$-(3,4-dimethoxyphenyl)ethylamine is heated at 190–210° C. under nitrogen for two hours. The resulting mixture is dissolved in boiling methylene chloride, which is gradually replaced by addition of ether. Filtering and recrystallizing from methylene chloride-ether gives N-[$\beta$-(3,4-dimethoxyphenyl)ethyl]-3-ethyl - 1,2,3,4,6,7,12,12b-octahydroindolo[2,3-a]quinolizine-2-acetamide.

A mixture of 0.5 g. of the above prepared compound, 10 ml. of phosphorus oxychloride and 100 ml. of 1,2-dichloroethane is boiled at reflux for four hours. The solution is hydrolyzed and the resultant mixture made alkaline with aqueous ammonia. The organic layer is separated, washed with saturated aqueous sodium chloride solution and dried over sodium sulfate. The solvent is removed in vacuo and the residue is chromatographed. Elution with 9:1-chloroform-methanol, filtration and recrystallization from methylene chloride-ether gives 3-ethyl-2-(3,4-dihydro - 6,7 - dimethoxyisoquinolin - 1 -ylmethyl) - 1,2,3,4,6,7,12,12b - octahydroindolo[2,3 - a]-quinolizine, M.P. 181.5–183° C.

Treating the above prepared base with ethereal hydrogen chloride gives the dihydrochloride salt.

Treating the above prepared base with an excess of methyl iodide gives the methiodide salt.

EXAMPLE 2

A mixture of 2.0 g. of 3-ethyl-2-(3,4-dihydro-6,7-dihydro - 6,7 - dimethoxyisoquinolin - 1 - ylmethyl) - 1,2,3,4,6,7,12,12b - octahydroindolo[2,3 - a]quinolizine (prepared as in Example 1) and 2.0 g. of sodium borohydride in 100 ml. methanol is boiled at reflux for two hours. The mixture is taken to dryness in vacuo and the residue dissolved in chloroform. The resultant solution is washed with saturated aqueous sodium chloride solution and dried over sodium sulfate. The solvent is removed in vacuo and the residue treated with ethereal hydrogen chloride. The product, 3-ethyl-2-(1,2,3,4-tetrahydro-6,7-dimethoxyisoquinolin - 1 - ylmethyl) - 1,2,3,4,6,7,12,12b-octahydroindolo[2,3-a]quinolizine hydrochloride is collected by filtration with suction.

EXAMPLE 3

Two grams of 3-ethyl-2-(1,2,3,4-tetrahydro-6,7-dimethoxyisoquinolin - 1 - ylmethyl) - 1,2,3,4,6,7,12,12b - octahydroindolo[2,3-a]quinolizine (prepared as in Example 2) is heated with 10 ml. of formic acid and 10 ml. of formaldehyde (37%) at 95–100° C. for eight hours. Aqueous hydrochloric acid (100 ml.) is added and the mixture taken to dryness in vacuo. The residue is taken up in a mixture of chloroform and aqueous ammonia. After separation of the organic layer, the aqueous solution is extracted with additional chloroform. The combined organic layers are washed with saturated aqueous sodium chloride solution and dried over sodium sulfate. Removal of solvent in vacuo gives 3-ethyl-2-(1,2,3,4-tetrahydro - 6,7 - dimethoxy - 2 - methylisoquinolin - 1 - ylmethyl) - 1,2,3,4,6,7,12,12b - octahydroindolo[2,3 - a] quinolizine.

A mixture of 2 g. of 2-(1,2,3,4-tetrahydro-6,7-dimethoxyisoquinolin - 1 - ylmethyl) - 3 - ethyl - 1,2,3,4,6,7,12,12b-octahydroindolo[2,3-a]quinolizine and 5 ml. acetic anhydride in 25 ml. ether is kept at 25° C. for six hours. The mixture is concentrated to dryness in vacuo, treated with 50 ml. tetrahydrofuran and 2 g. of lithium aluminum hydride and boiled at reflux for three hours. Excess hydride is decomposed by careful addition of water. The precipitated solid is separated by filtration with suction, washed with methylene chloride and again filtered. The combined filtrates are concentrated in vacuo and the residue again dissolved in methylene chloride. The solution is washed with saturated aqueous sodium chloride and dried over sodium sulfate. Removal of solvent in vacuo and recrystallization from methylene chloride-ether gives 3-ethyl-2-(2-ethyl-1,2,3,4-tetrahydro-6,7-dimethoxyisoquinolin - 1 - ylmethyl) - 1,2,3,4,6,7,12,12b - octahydroindolo[2,3-a]quinolizine.

Similarly, using butyryl chloride in place of acetyl chloride in the above reaction an n-butyl group is placed on the N-atom of the isoquinolinyl ring to give the corresponding 2-butyl compound.

By the same procedure using benzoyl chloride or phenylacetyl chloride, the products are 2-(2-benzyl-1,2,3,4-tetrahydro - 6,7 - dimethoxyisoquinolin - 1 - ylmethyl) - 3 - ethyl - 1,2,3,4,6,7,12,12b - octahydroindolo[2,3 - a] quinolizine and 2-(2-phenethyl-1,2,3,4-tetrahydro-6,7-dimethoxyisoquinolin - 1 - ylmethyl) - 3 - ethyl - 1,2,3,4,6, 7,12,12b-octahydroindolo[2,3-a]quinolizine.

EXAMPLE 4

3.6 grams of 2-(3,4-dihydro-6,7-dimethoxyisoquinolin-1 - ylmethyl) - 3 - ethyl - 1,2,3,4,6,7,12,12b - octahydro - indolo[2,3-a]quinolizine (prepared as in Example 1) in 25 ml. of methanol is added to a stirred solution of 1.1 g. of anyhdrous sodium acetate and 0.6 g. of iodine in 20 ml. of 95% ethanol. The resulting mixture is heated at reflux for 15 minutes. Cooling the mixture, concentrating in vacuo and recrystallizing the residue from methylene chloride-petroleum ether gives 3-ethyl-2-(6,7-dimethoxyisoquinolin - 1 - ylmethyl) - 1,2,3,4,6,7,12,12b - octahydroindolo[2,3-a]-quinolizine.

Treating the above prepared base in ether with an equal molar amount of glacial acetic acid, then removing the solvent in vacuo gives the acetate salt.

EXAMPLE 5

A mixture of 4.6 g. of methyl 3-ethyl-1,2,3,4,6,7,12, 12b - octahydroindolo[2,3 - a]quinolizine - 2 - acetate and 5.5 g. of β-(3,4-methylenedioxyphenyl)ethylamine is heated under nitrogen at 200° C. for two hours and worked up as in Example 1 to give N-[β-(3,4-methylenedioxyphenyl) - ethyl - 3 - ethyl - 1,2,3,4,6,7,12,12b - octahydroindolo[2,3-a]-quinolizine-2-acetamide.

A mixture of 1 g. of the above prepared compound, 20 ml. of phosphorus oxychloride and 150 ml. of 1,2-dichloroethane is heated at reflux for four hours to give, after working up as in Example 1, 3-ethyl-2-(3,4-dihydro-6,7-methylenedioxyisoquinolin - 1 - ylmethyl) - 1,2,3,4,6,7,12, 12b-octahydroindolo[2,3-a]quinolizine.

EXAMPLE 6

A mixture of 3.0 g. of methyl 3-ethyl-1,2,3,4,6,7,12, 12b - octahydroindolo[2,3 - a]quinolizine - 2 - acetate and 1.65 g. of tryptamine is heated at 210° C. under nitrogen for two hours. Crystallization from methylene chloride gives N-[2-(3-indolo)ethyl-3-ethyl-1,2,3,4,6,7, 12,12b-octahydroindolo[2,3-a]quinolizine-2-acetamide.

Phosphorus oxychloride (50 ml.) is added to a boiling mixture of 1.4 g. of the above prepared compound in 500 ml. of 1,2-dichloroethane, heating is continued for two hours and then 100 ml. of cold water is carefully added with external cooling. The mixture is made alkaline with aqueous ammonia; the organic layer is separated and the aqueous solution extracted with chloroform. The combined organic layers are washed with saturated aqueous sodium chloride solution and dried. The solvent is removed in vacuo and the residue is dissolved in 50:1-chloroform-methanol and chromatographed. Elution with the same solvent mixture yields 3-ethyl-2-(3,4-dihydro- carbolin - 1 - ylmethyl) - 1,2,3,4,6,7,12,12b - octahydroindolo[2,3-a]quinolizine which is treated with ethereal hydrogen chloride and the product recrystallized from methanol-ethyl acetate to give the dihydrochloride salt, M.P. 301–303° C. (dec.).

EXAMPLE 7

By the procedure of Example 2, 3-ethyl-2-(3,4-dihydrocarbolin - 1 - ylmethyl) - 1,2,3,4,6,7,12,12b - octahydro - indolo[2,3-a]quinolizine (prepared as in Example 6) is reduced with sodium borohydride in ether to give 3-ethyl-2 - (1,2,3,4 - tetrahydrocarbolin - 1 - ylmethyl) - 1,2,3,4, 6,7,12,12b-octahydroindolo[2,3-a]quinolizine.

Heating the above prepared compound (1 g.) with 10 ml. formic acid and 10 ml. of formaldehyde as in Example 3 gives 3-ethyl-2-(1,2,3,4-tetrahydro-2-methylcarbolin-1 - ylmethyl) - 1,2,3,4,6,7,12,12b - octahydroindolo[2, 3-a]quinolizine.

EXAMPLE 8

By the procedure of Example 4, adding 2.0 g. of 3-ethyl - 2 - (3,4 - dihydrocarbolin - 1 - ylmethyl) - 1,2,3,4,6,7, 12,12b-octahydroindolo[2,3-a]quinolizine (prepared as in Example 6) in methanol to a stirred solution of 1.2 g. of anhydrous sodium acetate and 0.7 g. of iodine in 95% ethanol, refluxing the resulting mixture and working up gives 2-(carbolin-1-ylmethyl)-3-ethyl-1,2,3,4,6,7,12,12b-octahydro[2,3-a]quinolizine.

EXAMPLE 9

A mixture of 79 g. of 3-(2-aminoethyl)-5,6-dimethoxyindole (57.0 g.) and 400 ml. of ethyl formate is heated at 95° C. in a sealed pressure vessel for 17 hours. The cooled solution is taken to dryness of vacuo and the residue is dissolved in chloroform and sequentially washed with 5% hydrochloric acid, 5% sodium bicarbonate and saturated aqueous sodium chloride and dried over sodium sulfate. Removal of solvent in vacuo gives 3-(N-formyl-β-aminoethyl)5,6-dimethoxyindole.

To a stirred solution of 58.0 g. of the above prepared compound in 500 ml. of dichloroethane, 90 g. of phosphorus oxychloride is added over a five minute period. The solution is boiled at reflux for three hours; then heating is stopped and 125 ml. of water is added dropwise. The resulting solution is maintained at about 25° C. while concentrated ammonia is added until the aqueous layer is alkaline. Chloroform is added and the mixture is stirred for 30 minutes. The organic layer is washed with saturated aqueous sodium chloride and dried over sodium sulfate. Removal of solvent in vacuo, and chromatographing the residue in chloroform gives 3,4-dihydro-6,7-dihydro-6,7-dimethoxy-β-carboline.

A stirred mixture of 45 g. of 3,4-dihydro-6,7-dimethoxy-β-carboline, 64 g. of 3-dimethylaminomethylpentan-2-one methiodide and 500 ml. of anhydrous methanol is boiled at reflux for two hours. The mixture is concentrated in vacuo and the residue treated with dilute ammonia and chloroform. The organic layer is separated and is washed with saturated aqueous sodium chloride solution and dried over sodium sulfate. The chloroform solution is concentrated and chromatographed with continued elution using chloroform. Fractions are collected, treated with ether and filtered to give 3-ethyl-9,10-dimethoxy-2-oxo-1,2,3,4,6,7,12,12b-octahyroindolo[2,3-a]quinolizine.

To a stirred slurry of sodium hydride (6 g. of 50% composition in oil) in 300 ml. of benzene under nitrogen there in gradually added a solution of 45 g. of trimethyl phosphonoacetate in 100 ml. of benzene. The resulting mixture is stirred for one hour; 25.4 g. of 3-ethyl-9,10-dimethoxy - 2 - oxo - 1,2,3,4,6,7,12,12b - octahydroindolo-[2,3-a]quinolizine is added and the mixture is stirred for 18 hours. The mixture is filtered to give 3-ethyl-9,10-dimethoxy - 2 - (methoxycarbonylmethylene) - 1,2,3,4,6-7,12,12b-octahydroindolo[2,3-a]quinolizine.

A mixture of 14 g. of the above prepared compound, 100 ml. of anhydrous ethanol and 5 g. of 10% palladium on carbon is shaken with hydrogen (initial pressure 3.7 atmosphere) for 3.5 hours. The resulting mixture is filtered and concentrated in vacuo. The residue is treated with aqueous ammonia-ether. The organic layer is separated and washed with saturated aqueous sodium chloride and dried over sodium sulfate. Removal of solvent in vacuo and crystallization from ether-petroleum ether gives the 2α,3β,12b-α isomer of methyl 3-ethyl-9,10-dimethoxy-1,2,3,4,6,7,12,12b - octahydroindolo[2,3 - a]quinolizine-2-acetate.

The above prepare compound (2.6 g.) and 2.0 g. of phenethylamine are heated at 190–200° C. for two hours under nitrogen. Working up as in Example 1 gives the 2α,3β,12b-α isomer of N-(β-phenethyl-3-ethyl-9,10-dimethoxyl - 1,2,3,4,6,7,12,12b - octahydroindolo[2,3 - a] quinolizine-2-acetamide.

Refluxing 1 g. of the above prepared compound with 25 ml. of phosphorus oxychloride in 200 ml. of 1,2-dichloroethane for five hours and working up as in Example 1 gives the 2α,3β,12b-α isomer of 3-ethyl-2-(3,4-dihydroisoquinolin - 1 ylmethyl) - 9,10 - dimethoxy - 1,2,3,4,6,7,12,12b-octahydroindolo[2,3-a)quinolizine.

Refluxing the above prepared compound with hydroiodic acid in acetic acid for two hours and then concentrating the mixture in vacuo and recrystallizing the residue gives the 2α,3β,12b-α isomer of 3-ethyl-2-(3,4-dihydroisoquinolin - 1 ylmethyl) - 3 - ethyl - 9,10-dihydroxy - 1,2,3,4,6,7,12,12b-octahydroindolo[2,3-a]quinolizine.

EXAMPLE 10

By the procedure of Example 9, 114 g. of 3-(2-aminoethyl)indole is heated with 800 ml. of ethyl formate to give the N-formyl compound which is treated with phosphorus oxychloride to give 3,4-dihydro-β-carboline.

A mixture of 70 g. of the above prepared carboline, 128 g. of 3-dimethylaminomethylbutan-2-one methiodide in 350 ml. of anhydrous methanol is heated at reflux for two hours. Working up as in Example 9 gives 3-methyl-2-oxo-1,2,3,4,6,7,12,12b-octahydroindolo[2,3-a]quinolizine. Reacting this intermediate with trimethyl phosphonoacetate gives the corresponding 2-(methoxycarbonylmethylene) compound.

The above prepared compound (8.5 g.) is added to a solution of 0.58 g. of sodium is 350 ml. of absolute ethanol and the resulting mixture is boiled at reflux for 48 hours. Acetic acid (12 ml.) is added to the cooled solution which is then taken to dryness in vacuo. The residue is treated with dilute aqueous ammonia and ether; the organic layer is separated and washed with saturated aqueous sodium chloride and dried over sodium sulfate. The ether is concentrated in vacuo to about 100 ml. and chromatographed to give methyl 3-methyl-1,4,6,7,12,12b-hexahydroindolo[2,3-a]quinolizine-2-acetate.

A solution of 2.63 g. of the above prepared compound in 200 ml. of methanol is added to a stirred solution of 10.8 g. of anhydrous sodium acetate and 5.93 g. of iodine in 200 ml. of 95% ethanol. The resulting mixture is boiled at reflux for 15 minutes and taken to dryness in vacuo. A solution of 6.6 g. of sodium perchlorate and 6.6 g. of sodium sulfite in 330 ml. of water is added with vigorous stirring which is continued for an additional 15 minutes. The mixture is filtered, the solid material is washed with water and ether and dried in vacuo at 78° C. for three hours to give 2-methoxycarbonylmethyl-3-methyl-6,7 - dihydro-12H - indolo[2,3-a]quinolizinium perchlorate.

To a solution of 0.21 g. of sodium in 200 ml. of absoulte ethanol is added 2.0 g. of the above prepared compound and 3.0 g. of 10% palladium on carbon and the mixture is hydrogenated at atmospheric pressure for 24 hours. The mixture is filtered, made slightly acidic with acetic acid and then evaporated to dryness in vacuo. The residue is treated with dilute aqueous ammonia and extracted with ether. The ether extract is washed with saturated aqueous sodium chloride solution and dried over sodium sulfate. The solvent is removed in vacuo and the residue, in ether, is chromatographed to give the 2α,3α,12b-α-isomer of methyl 3-methyl-1,2,3,4,6,7,12,12b - octahydroindolo[2,3 - a]quinolizine - 2-acetate.

The above prepared intermediate is reacted with phenethylamine as in Example 1 to give the N-(2-phenethyl)-acetamide which on treatment with phosphorus oxychloride in 1,2-dichloroethane gives the 2α,3α,12b-α isomer of 2-(3,4-dihydroisoquinolin-1-ylmethyl)-3-methyl - 1,2,3,4,6,7,12,12b-octahydroindolo[2,3-a]quinolizine.

EXAMPLE 11

By the procedure of Example 9, 35 g. of 3,4-dihydro-β-carboline and 56.5 g. of 1-dimethylaminobutan-3-one methiodide in 500 ml. of anhydrous methanol are heated at reflux for two hours to give 2-oxo-1,2,3,4,6,7,12,12b-octahydroindolo[2,3-a]quinolizine.

Similarly, refluxing 35 g. of 3,4-dihydro-β-carboline and 69 g. of 3-dimethylaminomethylheptan-2-one methiodide in 500 ml. of anhydrous methanol gives 3-butyl-2-oxa - 1,2,3,4,6,7,12,12b - octahydroindolo[2,3-a]quinolizine.

Each of the above prepared intermediates is reacted with trimethyl phosphonoacetate as in Example 9 to give the respective 2-(methoxycarbonylmethylene) compounds which are hydrogenated using 10% palladium on carbon as catalyst to give the 2α,3β,12b-α isomers of methyl 1,2,3,4,6,7,12,12b - octahydroindolo[2,3-a]quinolizine-2-acetate and the corresponding 3-butyl compound, respectively.

According to the procedure of Example 1, the above prepared compounds are heated with phenethylamine at 190° C. for two hours under nitrogen to give, after working up as in Example 1, the 2α,3β,12b-α isomers of N-(β - phenethyl) - 1,2,3,4,6,7,12,12b-octahydroindolo[2,3-a]quinolizine-2-acetamide and the corresponding 3-butyl compound, respectively.

The above prepared compounds are refluxed with phosphorus oxychloride in 1,2-dichloroethane for five hours and worked up as in Example 1 to give the 2α,3β,12b-α isomers of 2-(3,4-dihydroisoquinolin-1-ylmethyl)-1,2,3,4,6,7,12,12b-octahydroindolo[2,3-a]quinolizine and the corresponding 3-butyl compound, respectively.

EXAMPLE 12

A mixture of 3.0 g. of methyl 3-ethyl-1,2,3,4,6,7,12,12b-octahydroindolo[2,3-a]quinolizine-2-acetate, 3.8 g. of 3-(2-aminoethyl)-5,6-bisbenzyloxyindole is heated at 200° C. for two hours under nitrogen to give, after crystallization from methylene chloride, N-{β-[3-(5,6-bisbenzyloxy)indolo]ethyl} - 1,2,3,4,6,7,12,12b - octahydroindolo[2,3-a]quinolizine-2-acetamide.

Heating 2.0 g. of the above prepared compound with 50 ml. of phosphorus oxychloride in 500 ml. of 1,2-dichloroethane for two hours and working up as in Example 6 gives 2-(6,7-bisbenzyloxy-3,4-dihydrocarbolin-1-ylmethyl)-3-ethyl-1,2,3,4,6,7,12,12b - octahydroindolo[2,3-a]quinolizine.

The above prepared compound is heated at reflux with concentrated hydroiodic acid. The mixture is neutralized with sodium hydroxide solution and extracted with chloroform. Removal of the chloroform from the extracts in vacuo gives 2-(3,4-dihydro-6,7-dihydroxycarbolin-1-ylmethyl)-3-ethyl - 1,2,3,4,6,7,12,12b - octahydroindolo[2,3-a]quinolizine.

EXAMPLE 13

By procedure of Example 12, reacting 3.0 g. of methyl 3 - ethyl - 1,2,3,4,6,7,12,12b - octahydroindolo[2,3 - a]quinolizine with 2.4 g. of 3-(2-aminoethyl)-7-butoxyindole and heating the resulting intermediate with phosphorus oxychloride gives 2-(8-butoxy-3,4-dihydrocarbolin-1-ylmethyl)-3-ethyl - 1,2,3,4,6,7,12,12b-octahydroindolo[2,3-a]quinolizine.

Similarly, using 1.8 g. of 3-(2-aminoethyl)-6-methylindole in the above reaction procedure the product is 3-ethyl-2-(3,4-dihydro-7 - methylcarbolin-1-ylmethyl)-1,2,3,4,6,7,12,12b-octahydroindolo[2,3-a]quinolizine.

EXAMPLE 14

By the procedure of Example 9, 3-(2-aminoethyl)-5-methylindole is converted to the N-formyl derivative. Heating this intermediate with phosphorus oxychloride gives 3,4-dihydro-6-methyl-β-carboline which is then heated at reflux with 3-dimethylaminomethylpentan-2-one methiodide in anhydrous methanol to give 3-ethyl-9-methyl - 2 - oxo-1,2,3,4,6,7,12,12b-octahydroindolo[2,3-a]quinolizine. Conversion of this intermediate to the 2-(methoxycarbonylmethylene) compound and hydrogenation gives the 2α,3β,12b-α isomer of methyl 3-ethyl-9-methyl-1,2,3,4,6,7,12,12b - octahydroindolo[2,3 - a]quinolizine-2-acetate.

A mixture of 3.1 g. of the above prepared compound ando 1.8 of 3-(2-aminoethyl)-1-methylindole is heated at 200° C. for two hours under nitrogen and the resulting intermediate is heated with phosphorous oxychloride to give the 2α,3β,12b-α isomer of 2-(3,4-dihydro-9-methylcarbolin-1-ylmethyl) - 3 - ethyl-1,2,3,4,6,7,12,12b-octahydroindolo[2,3-a]quinolizine.

Using 3-(2-aminoethyl)-1-ethyltryptamine in this reaction procedure the product is 3-ethyl-2-(3,4-dihydro-9-ethylcarbolin-1-ylmethyl) - 1,2,3,4,6,7,12,12b - octahydroindolo[2,3-a]quinolizine. Similarly, using 3-(2-aminoethyl)-1-benzylindole and 3-(2-aminoethyl)-1-phenethylindole in this reaction procedure the products are 3-ethyl 2-(3,4-dihydro-9-benzylcarbolin-1-ylmethyl)-1,2,3,4,6,7,12,12b-octahydroindolo[2,3-a]quinolizine and the corresponding 2-(3,4-dihydro-9 - phenethylcarbolin-1-ylmethyl) compound, respectively.

EXAMPLE 15

Using 3-(2-aminoethyl) - 6 - isopropoxyindole in the procedure of Example 9, the 2α,3β,12b-α isomer of methyl 3-ethyl-10 - isopropoxy - 1,2,3,4,6,7,12,12b - octahydroindolo-[2,3-a]quinolizine-2-acetate is obtained.

A mixture of 2.7 g. of the above prepared compound and 3.5 g. of β-(2,3-diethoxyphenyl)ethylamine is heated under nitrogen for two hours to give, after working up as in Example 1, the 2α,3β,12b-α isomer of N[β-(2,3-diethoxyphenyl)ethyl]-3-ethyl-10 - isopropoxy - 1,2,3,4,6,7,12,12b-octahydroindolo[2,3-a]quinolizine - 2 - acetamide. This intermediate is heated with phosphorus oxychloride in 1,2-dichloroethane to give the 2α,3β-12b-α isomer of 3-ethyl-2 - (3,4 - dihydro - 7,8 - diethoxyisoquinolin - 1-ylmethyl)10-isopropoxy - 1,2,3,4,6,7,12,12b - octahydroindolo[2,3-a]quinolizine.

Treating the above prepared compound with ethereal hydrogen bromide gives the dihydrobromide salt.

EXAMPLE 16

By the procedure of Example 9 3-(2-aminoethyl) - 1-methylindole is converted to the N-formyl derivative which is heated with phosphorus oxychloride to give 3,4-dihydro-9-methyl-β-carboline. This intermediate is heated at reflux with 3-dimethylaminomethylpentan-2-one methiodide in anhydrous methanol to give 3-ethyl-12-methyl-2-oxo-1,2,3,4,6,7,12,12b - octahydroindolo[2,3 - a]quinolizine which is treated with trimethyl phosphonoacetate and the resulting 2-methoxycarbonylmethylene compound is hydrogenated to give the 2α,3β-12b-α isomer of methyl 3-ethyl-12 - methyl - 1,2,3,4,6,7,12,12b - octahydroindolo[2,3-a]quinolizine-2-acetate.

Reacting the above prepared compound with β-(3,4-dimethoxyphenyl)ethylamine as in Example 1 and refluxing the resulting N-[β-(3,4 - dimethoxyphenyl)ethyl] - 3-ethyl - 12 - methyl - 1,2,3,4,6,7,12,12b - octahydroindolo[2,3-a]quinolizine-2-acetamide with phosphorus oxychloride in 1,2-dichloroethane gives 3-ethyl-2-(3,4-dihydro-6,7-dimethoxyisoquinolin-1-ylmethyl)-12 - methyl - 1,2,3,4,6,7,12,12b-octahydroindolo[2,3-a]quinolizine.

Similarly, using 3-(2-aminoethyl)-1-ethylindole as the starting material the product is 3,12-diethyl-2 - (3,4 - dihydro-6,7-dimethoxyisoquinolin-1-ylmethyl) - 1,2,3,4,6,7,12,12b-octahydroindolo[2,3-a]quinolizine.

EXAMPLE 17

To a stirred slurry of 6 g. of sodium hydride (50% in oil) in 300 ml. of benzene under nitrogen is added a solution of triethyl 2-phosphonopropionate (prepared by treating the potassium derivative of triethyl phosphonoacetate with methyl iodide) in benzene. The resulting mixture is stirred for one hour, 20.8 g. of 3-ethyl-2-oxo - 1,2,3,4,6,7,12,12b-octahydroindolo[2,3-a]quinolizine is added and the stirring is continued for 18 hours to give, after filtering, 3-ethyl-2-(2-methoxycarbonylethylidene)-1,2,3,4,6,7,12,12b-octahydroindolo-[2,3-a]quinolizine.

Hydrogenation of the above prepared compound gives methyl 3-ethyl-1,2,3,4,6,7,12,12b - octahydroindolo[2,3-a]quinolizine-2-α-propionate.

Reacting the above prepared compound with β-(3,4-dimethoxyphenyl)ethylamine as in Example 1 and refluxing the resulting product with phosphorus oxychloride in 1,2-dichloroethane gives 3-ethyl-2-[1-(3,4-dihydro - 6,7 - dimethoxyisoquinolin-1-yl)ethyl] - 1,2,3,4,6,7,12,12b - octahydroindolo[2,3-a]quinolizine.

EXAMPLE 18

By the procedure of Example 9, 3-(2-aminoethyl)-5-chloroindole is heated with ethyl formate. The resulting N-formyl compound is treated with phosphorus oxychloride to give 6-chloro-3,4-dihydro-β-carboline. Refluxing this compound with 3-dimethylaminomethylpentan-2-one methiodide in anhydrous methanol and working up as in Example 9 gives 9-chloro-3-ethyl-2-oxo-1,2,3,4,6,7,12,12b-octahydroindolo[2,3-a]quinolizine. This intermediate is refluxed with triethyl phosphonoacetate to give the corresponding 2-(ethoxycarbonylmethylene) compound.

The above prepared compound (9.3 g.) is added to a solution of 0.58 g. of sodium in 350 ml. of absolute ethanol. The resulting mixture is heated at reflux for 48 hours to give, after working up as in Example 10, ethyl 9-chloro-3-ethyl - 1,4,6,7,12,12b - hexahydroindolo[2,3-a]quinolizine-2-acetate.

A solution of 2.9 g. of the above prepared intermediate in 200 ml. of methanol is added to a solution of 10.8 g. of anhydrous sodium acetate and 5.93 g. of iodine in 200 ml. of 95% ethanol and the resulting mixture is refluxed for 15 minutes. Evaporating to dryness in vacuo, adding an aqueous solution containing 6.6 g. of sodium perchlorate and 6.6 g. of sodium sulfite, stirring the resulting mixture and working up as in Example 10 gives 9-chloro-3-ethyl-2-ethoxycarbonylmethyl-6,7-dihydro - 12H-indolo[2,3-a]quinolizinium perchlorate.

To a solution of 0.21 g. of sodium in 200 ml. of absolute ethanol is added 2.1 g. of the above prepared compound and 3.0 g. of 10% palladium on carbon. The resulting mixture is hydrogenated at atmospheric pressure for 24 hours. Working up as in Example 10 gives the 2α,3α,12b-α isomer of ethyl 9-clhoro-3-ethyl-1,2,3,4,6,7,12,12b-octahydroindolo[2,3-a]quinolizine-2-acetate.

Reacting the above prepared intermediate with phenethylamine as in Example 1 and treating the resulting N-(2-phenethyl)acetamide with phosphorus oxychloride in 1,2-dichloroethane gives the 2α,3α,12b-α isomer of 9-chloro-3-ethyl-2-(3,4-dihydroisoquinolin - 1 - ylmethyl)-1,2,3,4,6,7,12,12b-octahydroindolo[2,3-a]quinolizine.

Similarly, using 3(2-aminoethyl)-6-chloroindolo and 3-(2-aminoethyl)-6-fluoroindole as the starting materials in the above procedure the products are 10-chloro-3-ethyl-2-(3,4-dihydroisoquinolin - 1 - ylmethyl)1,2,3,4,6,7,12,12b-octahydroindolo[2,3-a]quinolizine and 10-fluoro-3-ethyl-2-(3,4-dihydroisoquinolin-1-ylmethyl) - 1,2,3,4,6,7,12,12b-octahydroindolo[2,3-a]quinolizine, respectively.

EXAMPLE 19

By the procedure of Example 9, 3-(2-aminoethyl)-4-methoxyindole is heated with ethyl formate to give the N-formyl derivative which on treatment with phosphorus oxychloride gives 5-methoxy-3,4-dihydro-β-carboline. Refluxing this carboline with 3-dimethylaminomethylpentan-2-one methiodide in anhydrous methanol gives, after working up as in Example 9, 8-methoxy-3-ethyl-2-oxo-1,2,3,4,6,7,12,12b-octahydroindolo[2,3-a]quinolizine. Refluxing this intermediate with triethyl phosphonoactate gives the corresponding 2 - (ethoxycarbonylmethylene) compound.

9.2 grams of the above prepared compound is refluxed with a solution of 0.58 g. of sodium in 350 ml. of absolute ethanol for 45 hours and the mixture is worked up as in Example 10 to give ethyl 3-ethyl-8-methoxy-1,4,6,7,12,12b-hexahydroindolo[2,3-a]quinolizine-2-acetate.

The above prepared compound in methanol is added to a solution of anhydrous sodium acetate and iodine in 95% ethanol. The resulting mixture is refluxed for 20 minutes then evaporated to dryness in vacuo and treated with an aqueous solution of sodium perchlorate and sodium sulfite to give 2-ethoxycarbonylmethyl-3-ethyl-6,7-dihydro-8-methoxy-12H-indolo[2,3-a]quinolizinium perchlorate.

The above prepared compound and 10% palladium on charcoal are added to a solution of sodium in absolute ethanol and the resulting mixture is hydrogenated to give the 2α,3α,12b-α isomer of ethyl 3-ethyl-8-methoxy-1,2,3,4,6,7,12,12b-octahydroindolo[2,3-a]quinolizine-2-acetate.

A mixture of the above prepared compound and 3-(2-aminoethyl)-5-chloroindole is heated at 200° C. under nitrogen to give the N-{β-[3-(5-chloro)indolo]ethyl}-acetamide which is heated with phosphorus oxychloride in 1,2-dichloroethane to give the 2α,3α,12b-α isomer of 2-(6-chloro-3,4-dihydrocarbolin-1-ylmethyl) - 3 - ethyl-8-methoxy - 1,2,3,4,6,7,12,12b - octahydroindolo[2,3 - a]-quinolizine.

EXAMPLE 20

By the procedure of Example 12, methyl 3-ethyl-1,2,3,4,6,7,12,12b-octahydroindolo[2,3-a]quinolizine is reacted with 3-(2-aminoethyl)-5-methoxyindole to give N-{β-[3-(5 - methoxy)indolo]ethyl}-1,2,3,4,6,7,12,12b-octahydroindolo[2,3-a]quinolizine-2-acetamide which is heated with phosphorus oxychloride in 1,2-dichloroethane to give 3-ethyl - 2 - (6 - methoxy-3,4-dihydrocarbolin-1-ylmethyl)-1,2,3,4,6,7,12,12b-octahydroindolo[2,3-a]-quinolizine.

Similarly, using 3-(2-aminoethyl)-6-methoxyindole in the above reaction and heating the intermediate N-{β-[3-(6 - methoxy)indolo]ethyl}-1,2,3,4,6,7,12,12b-octahydroindolo[2,3-a]quinolizine - 2 - acetamade with phosphorus oxychloride in 1,2 - dichloroethane gives 3 - ethyl - 2 - (7-methoxy-3,4-dihydrocarbolin-1-ylmethyl) - 1,2,3,4,6,7,12,12b-octahydroindolo[2,3-a]quinolizine.

EXAMPLE 21

Five grams of 3-ethyl-2-(ethoxycarbonylmethylene)-1,2,3,4,6,7,12,12b - octahydroindolo[2,3-a]-quinolizine is added to a solution of 15 g. of mercuric acetate in 100 ml. of 5% acetic acid and the resulting mixture is heated under nitrogen on a steam bath for 20 minutes. The mixture is filtered and the warm filtrate is saturated with hydrogen sulfide gas and heated on a steam bath. The mixture is cooled to 20° C., filtered, treated with 30 g. of sodium perchlorate in 50 ml. of water and stirred. Filtering and recrystallizing from methanol using charcoal gives 3-ethyl-2-ethoxycarbonylmethyl - 6,7 - dihydro-12H-indolo[2,3-a]quinolizinium perchlorate.

By the procedure of Example 10, the above prepared quinolizinium compound is hydrogenated to give the 2α,3α,12b-α isomer of ethyl 3-ethyl-1,2,3,4,6,7,12,12b-octahydroindolo[2,3-a]quinolizine-2-acetate.

Heating the above prepared compound with phenethylamine as in Example 1 and treating the resulting N-(2-phenethyl)acetamide with phosphorus oxychloride in 1,2-dichloroethane gives the 2α,3α12b-α isomer of 3-ethyl-2-(3,4-dihydroisoquinolin - 1 - ylmethyl)-1,2,3,4,6,7,12,12b-octahydroindolo[2,3-a]quinolizine.

EXAMPLE 22

A mixture of 1 g. of 3-ethyl-2-(ethoxycarbonylmethylene)-1,2,3,4,6,7,12,12b - octahydroindolo[2,3-a]-quinolizine, 10 g. of maleic acid in 150 ml. of water and 2 g. of palladium on charcoal is heated at reflux for eight hours, then filtered hot. To the cooled solution 10 ml. of 70% aqueous perchloric acid is added to give the quinolizinium perchlorate which is converted, as described in Example 21, to the 2α,3α,12b-α isomer of 3-ethyl-2-(3,4-dihydroisoquinolin - 1 - ylmethyl)-1,2,3,4,6,7,12,12b-octahydroindolo[2,3-a]quinolizine.

What is claimed is:

1. A compound selected from the group consisting of compounds of the formulas:

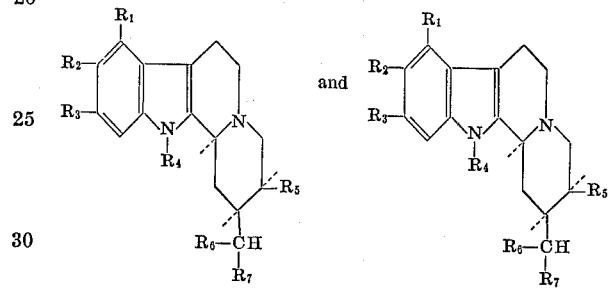

and nontoxic, pharmaceutically acceptable, acid addition salts thereof, in which:

$R_1$ is a member selected from the group consisting of hydrogen and methoxy;

$R_2$ is a member selected from the group consisting of hydrogen and when $R_1$ is hydrogen, chloro, fluoro, hydroxy, methoxy and methyl;

$R_3$ is a member selected from the group consisting of hydrogen and when $R_2$ is hydroxy, hydroxy and when $R_2$ is methoxy, methoxy;

$R_4$, $R_5$ and $R_6$ are members selected from the group consisting of hydrogen, methyl and ethyl;

$R_7$ is a member selected from the group consisting of

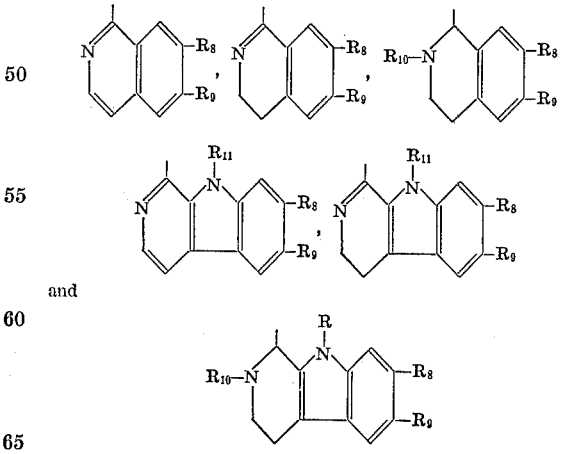

$R_8$ is a member selected from the group consisting of hydrogen, chloro, hydroxy, methoxy and methyl;

$R_9$ is a member selected from the group consisting of hydrogen and when $R_8$ is hydrogen, chloro, hydroxy, methoxy and methyl and $R_8$ and $R_9$ taken together, dihydroxy, dimethoxy and methylenedioxy; and $R_{10}$ and $R_{11}$ are members selected from the group consisting of hydrogen, methyl, ethyl, benzyl and phenethyl.

2. A compound of the formula:

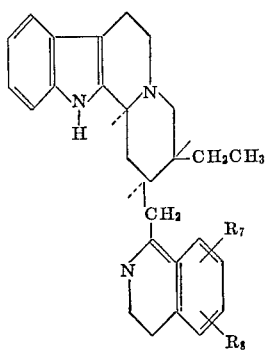

in which R₇ and R₈ are lower alkoxy.

3. A compound of the formula:

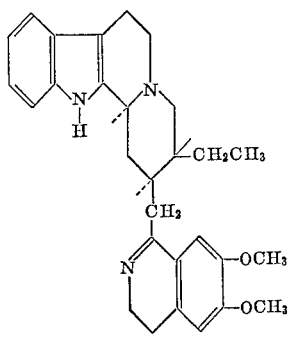

4. A compound of the formula:

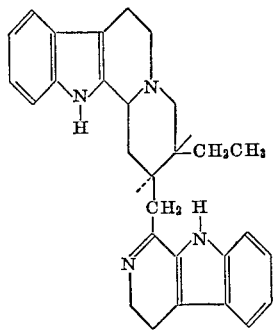

5. A compound selected from the group consisting of compounds of the formulas:

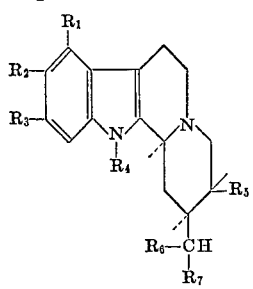 and 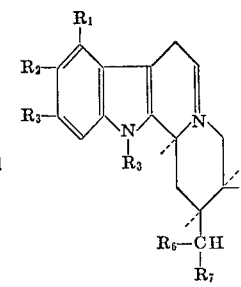

in which:
$R_1$ is a member selected from the group consisting of hydrogen and methoxy;
$R_2$ is a member selected from the group consisting of hydrogen and when $R_1$ is hydrogen, cholor, fluoro, benzyloxy, methoxy and methyl;
$R_3$ is a member selected from the group consisting of hydrogen and when $R_2$ is benzyloxy, benzyloxy and when $R_2$ is methoxy, methoxy;
$R_4$, $R_5$ and $R_6$ are members selected from the group consisting of hydrogen, methyl and ethyl;

$R_7$ is a member selected from the group consisting of

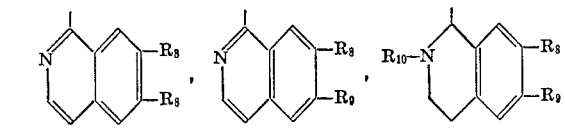

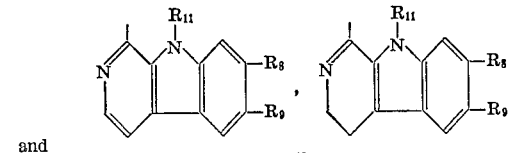

and

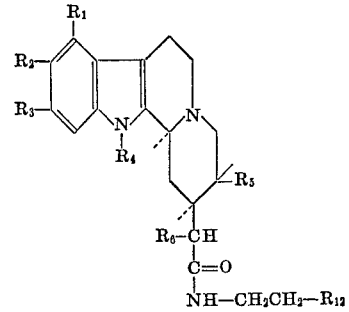

$R_8$ is a member selected from the group consisting of hydrogen, cholor, benzyloxy, methoxy and methyl;
$R_9$ is a member selected from the group consisting of hydrogen and when $R_8$ is hydrogen, chloro, benzyloxy, methoxy and methyl and $R_8$ and $R_9$ taken together, dibenzyloxy, dimethoxy and methylenedioxy; and
$R_{10}$ and $R_{11}$ are members selected from the group consisting of hydrogen, methyl, ethyl, benzyl and phenethyl; at least one of $R_2$, $R_8$ and $R_9$ being benzyloxy.

6. A compound selected from the group consisting of compounds of the formulas:

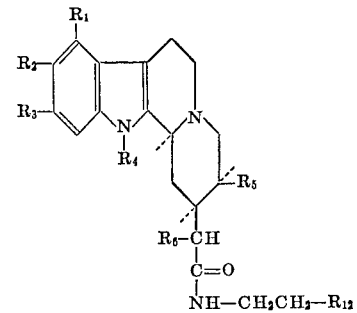

and

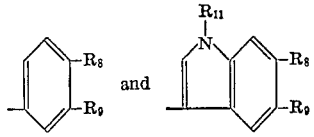

in which:
$R_1$ is a member selected from the group consisting of hydrogen and methoxy;
$R_2$ is a member selected from the group consisting of hydrogen and when $R_1$ is hydrogen, chloro, fluoro, benzyloxy, methoxy and methyl;
$R_3$ is a member selected from the group consisting of hydrogen and when $R_2$ is benzyloxy, benzyloxy and when $R_2$ is methoxy, methoxy;
$R_4$, $R_5$ and $R_6$ are members selected from the group consisting of hydrogen, methyl and ethyl;
$R_{12}$ is a member selected from the group consisting of

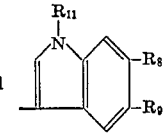

$R_8$ is a member selected from the group consisting of hydrogen, cholor, benzyloxy, methoxy and methyl;

R₉ is a member selected from the group consisting of hydrogen and when R₈ is hydrogen, chloro, benzyloxy, methoxy and methyl and R₈ and R₉ taken together, dibenzyloxy, dimethoxy and methylenedioxy; and R₁₁ is a member selected from the group consisting of hydrogen, methyl, ethyl, benzyl and phenethyl.

7. A method of preparing 2α,3α,12b-α isomers of 1,2,3,4,6,7,12,12b-octahydroindolo[2,3-a]quinolizines of the formula:

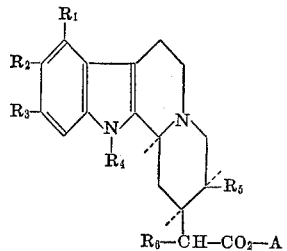

in which:

R₁ is a member selected from the group consisting of hydrogen and methoxy;

R₂ is a member selected from the group consisting of hydrogen and when R₁ is hydrogen, chloro, fluoro, benzyloxy, methoxy and methyl;

R₃ is a member selected from the group consisting of hydrogen and when R₂ is benzyloxy, benzyloxy and when R₂ is methoxy, methoxy;

R₄, R₅ and R₆ are members selected from the group consisting of hydrogen, methyl and ethyl; and A is lower alkyl which comprises reacting a 1,2,3,4-tetrahydro-2-alkoxycarbonylmethylene compound of the formula:

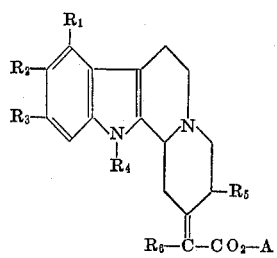

in which R₁, R₂, R₃, R₄, R₅, R₆ and A are as previously defined, with an alkali metal alkoxide in anhydrous lower alkanol to give the corresponding 2-alkoxycarbonylmethyl-1,4,-dihydro compound of the formula:

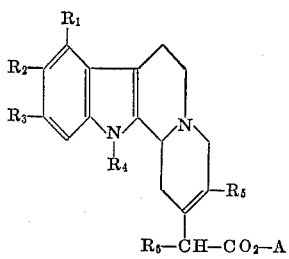

in which R₁, R₂, R₃, R₄, R₅, R₆ and A are as previously defined; oxidizing the above prepared 2-alkoxycarbonylmethyl-1,4,-dihydro compound by treating with a mild oxidizing agent to give an indolo[2,3-a]quinolizinium compound of the formula:

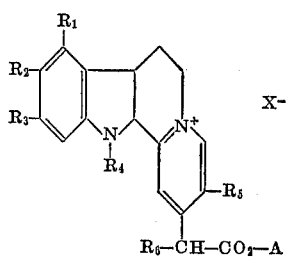

in which R₁, R₂, R₃, R₄, R₅, R₆ and A are as previously defined and X is an anion; and reducing the above prepared indolo[2,3-a]-quinolizinum compound by hydrogenating in the presence of a hydrogenation catalyst and an excess of base in a lower alkanol solvent.

8. A method of preparing 2α,3α,12b-α isomers of 1,2,-3,4,6,7,12,12b-octahydroindolo[2,3-a]quinolizines of the formula:

$$\text{[structure]}$$

in which:

R₁ is a member selected from the group consisting of hydrogen and methoxy;

R₂ is a member selected from the group consisting of hydrogen and when R₁ is hydrogen, chloro, fluoro, benzyloxy, methoxy and methyl;

R₃ is a member selected from the group consisting of hydrogen and when R₂ is benzyloxy, benzyloxy and when R₂ is methoxy, methoxy;

R₄, R₅ and R₆ are members selected from the group consisting of hydrogen, methyl and ethyl; and A is lower alkyl which comprises oxidizing with a member selected from the group consisting of mercuric acetate and palladium on charcoal with maleic acid, a 1,2,3,4-tetrahydro-2-alkoxycarbonylmethylene compound of the formula:

$$\text{[structure]}$$

in which R₁, R₂, R₃, R₄, R₅, R₆ and A are as previously defined; to give an indolo[2,3-a]quinolizinium compound and reducing said indolo[2,3-a]quinolizinium compound by hydrogenating in the presence of a hydrogenation catalyst and an excess of base in a lower alkanol solvent.

References Cited

UNITED STATES PATENTS

| | | | |
|---|---|---|---|
| 3,240,782 | 3/1966 | Brossi et al. | 260—286 |
| 3,311,633 | 3/1967 | Brossi | 260—288 |

OTHER REFERENCES

Burger: Medicinal Chemistry, 2d ed. Interscience, pp. 42, 497 and 551 (1960).

NICHOLAS S. RIZZO, *Primary Examiner.*

DONALD G. DAUS, *Assistant Examiner.*

U.S. Cl. X.R.

260—294.7, 294, 294.3, 690, 687, 256, 286, 326.15, 326.16, 326.14, 567.6